United States Patent
Yang et al.

(10) Patent No.: US 11,413,564 B2
(45) Date of Patent: Aug. 16, 2022

(54) UNIFORMLY STRUCTURED HIGH-PERMEABILITY MICROPOROUS MEMBRANE FOR FILTERING AND METHOD FOR PREPARING THE SAME, FLAT FILTERING ELEMENT AND GAS FILTERING ARTICLE

(71) Applicant: SHENZHEN SENIOR TECHNOLOGY MATERIAL CO., LTD., Guangdong (CN)

(72) Inventors: Xuemei Yang, Guangdong (CN); Wuhua Xiao, Guangdong (CN); Dongbo Gao, Guangdong (CN); Xiufeng Chen, Guangdong (CN)

(73) Assignee: SHENZHEN SENIOR TECHNOLOGY MATERIAL CO., LTD., Guangdong (CN)

( * ) Notice: Subject to any disclaimer, the term of this patent is extended or adjusted under 35 U.S.C. 154(b) by 1024 days.

(21) Appl. No.: 16/080,497

(22) PCT Filed: Dec. 29, 2017

(86) PCT No.: PCT/CN2017/120055
§ 371 (c)(1),
(2) Date: Aug. 28, 2018

(87) PCT Pub. No.: WO2018/227941
PCT Pub. Date: Dec. 20, 2018

(65) Prior Publication Data
US 2021/0187428 A1   Jun. 24, 2021

(30) Foreign Application Priority Data

Jun. 13, 2017  (CN) .................. 201710443461.X

(51) Int. Cl.
*B01D 53/22* (2006.01)
*B01D 46/54* (2006.01)
(Continued)

(52) U.S. Cl.
CPC ........... *B01D 46/543* (2013.01); *B01D 69/06* (2013.01); *B01D 71/26* (2013.01); *B01D 71/42* (2013.01);
(Continued)

(58) Field of Classification Search
CPC .... B01D 71/42; B01D 2325/24; B01D 71/26; B01D 46/543; B01D 69/06; B01D 2323/08; B01D 2323/12; B01D 67/0027
See application file for complete search history.

(56) References Cited

U.S. PATENT DOCUMENTS 4,230,463 A * 10/1980 Henis ................. B01D 53/22
                                                             95/55
5,011,762 A *  4/1991 Lee ...................... G03F 7/027
                                                             430/286.1
(Continued)

FOREIGN PATENT DOCUMENTS

CN    103633272 A    3/2014
CN    1103833273 A   3/2014
(Continued)

OTHER PUBLICATIONS

PCT International Search Report for PCT/CN2017/120055 dated Mar. 26, 2018.

*Primary Examiner* — Anthony R Shumate
(74) *Attorney, Agent, or Firm* — Meunier Carlin & Curfman LLC

(57) ABSTRACT

A microporous membrane for filtering and a method for preparing the same, a flat filtering element and a gas filtering article are disclosed. The microporous membrane is com-
(Continued)

posed of following raw materials in parts by weight: 100-110 parts of polyethylene, 27-30 parts of acrylonitrile, 0.1-0.2 parts of dicumyl peroxide, 2-4 parts of plasticizer, 1-2 parts of antimonous oxide, 0.8-1 part of zinc borate, 1-2 parts of antioxidant, 0.8-2 parts of heat stabilizer, 1-2 parts of octylisothiazolinone, 1-3 parts of calcium propionate, 0.7-2 parts of triglycidyl isocyanurate, 4-6 parts of diacetone alcohol, 0.7-1 part of oleic diethanolamide, 0.5-1 part of sodium myrastate and 1-2 parts of glycolic acid.

20 Claims, 1 Drawing Sheet

(51) Int. Cl.
    *B01D 69/06*     (2006.01)
    *B01D 71/26*     (2006.01)
    *B01D 71/42*     (2006.01)
    *B01D 67/00*     (2006.01)

(52) U.S. Cl.
    CPC ...... *B01D 67/0027* (2013.01); *B01D 2323/08* (2013.01); *B01D 2323/12* (2013.01); *B01D 2325/24* (2013.01)

(56) References Cited

U.S. PATENT DOCUMENTS

| | | | | |
|---|---|---|---|---|
| 6,103,828 | A * | 8/2000 | Kobayashi | C08K 5/0008 525/216 |
| 6,579,584 | B1 * | 6/2003 | Compton | B29C 55/28 428/522 |
| 6,703,437 | B1 * | 3/2004 | Kamiyama | C09D 125/06 524/421 |
| 2003/0012900 | A1 * | 1/2003 | Wolf | B32B 27/08 156/84 |
| 2006/0210908 | A1 * | 9/2006 | Umemura | G03G 21/0011 430/119.86 |
| 2011/0118424 | A1 * | 5/2011 | Yamashita | C08F 279/04 526/342 |
| 2012/0121944 | A1 * | 5/2012 | Yamamoto | H01M 50/103 429/7 |
| 2014/0319706 | A1 * | 10/2014 | Huizing | B32B 15/20 264/131 |
| 2018/0244918 | A1 * | 8/2018 | Bauer | C08L 77/06 |
| 2019/0076793 | A1 * | 3/2019 | Liu | B01D 71/80 |
| 2019/0168172 | A1 * | 6/2019 | Wang | C02F 1/44 |

FOREIGN PATENT DOCUMENTS

| | | |
|---|---|---|
| CN | 105140448 C | 12/2015 |
| CN | 105591056 A | 5/2016 |
| CN | 106565977 A | 4/2017 |
| CN | 107088368 A | 8/2017 |
| EP | 2111912 A1 | 10/2009 |
| EP | 1950821 B1 | 1/2013 |
| JP | S62221401 A | 9/1987 |
| KR | 20040077332 A | 9/2004 |

* cited by examiner

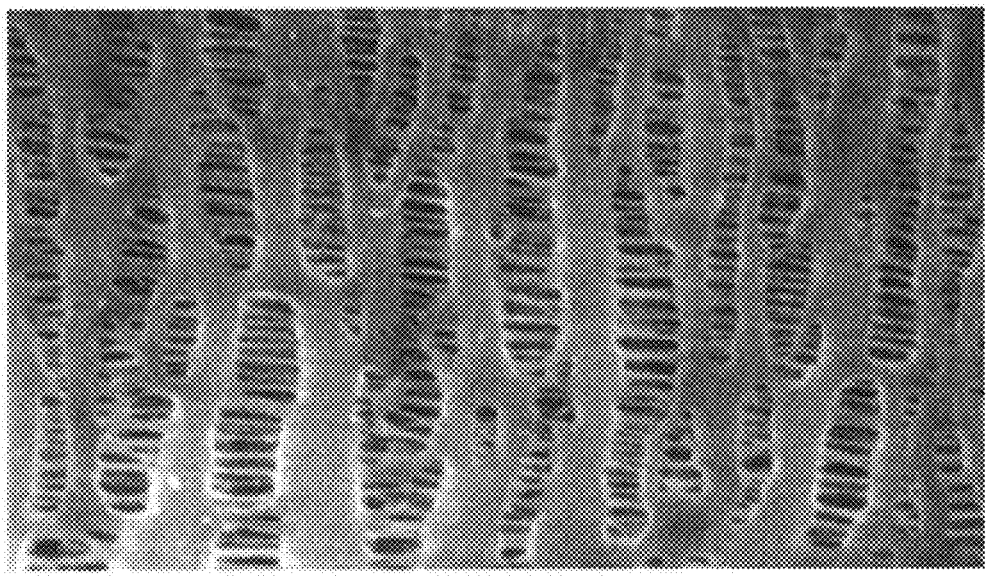

UNIFORMLY STRUCTURED HIGH-PERMEABILITY MICROPOROUS MEMBRANE FOR FILTERING AND METHOD FOR PREPARING THE SAME, FLAT FILTERING ELEMENT AND GAS FILTERING ARTICLE

The present disclosure claims the priority to the Chinese Patent Application with the filing No. CN201710443461.X, filed with the State intellectual Property Office (SIPO) of the People's Republic of China on Jun. 13, 2017, entitled "Uniformly Structured High-Permeability Microporous Membrane for Filtering and Method for Preparing the Same", which is incorporated herein by reference in its entirety.

TECHNICAL FIELD

The present disclosure relates to the field of filtering membrane materials, particularly to a uniformly structured high-permeability microporous membrane for filtering and a method for preparing the same, a flat filtering element and a gas filtering article.

BACKGROUND ART

In recent years, with environmental degradation such as smog and sand storms, no matter at home or in public places, people's body health is seriously endangered. Besides, with improvements on the living level, and the popularization of air conditioners for common people, in summer, air becomes turbid and extremely degraded in quality in a closed space where the air conditioner is used for a long period of time, thus leading to occurrence of more and more air conditioner syndromes, such as poor sleep quality, lowered immunity, and many conditions severely affecting body health. In winter, even if the air conditioner is not used, the same problems still exist at home as windows and doors are closed for a long period of time. Therefore, for such phenomena, Florida Research and Development Center of United States Department of Energy took the lead in development of "Panelwell" skylight system, i.e. an air purification supplement system, which realizes continuous purification of fresh air and oxygen supplement in closed environment, thus solves many sub-health problems brought about by degraded quality of ambient air.

The air purification supplement system uses an air filtering membrane to filter out toxic substances such as PM2.5 tiny dusts, bacteria and microorganisms from outdoor air and then supplements the filtered air to the room, meanwhile aspirates the turbid air indoor to the outside, thus realizing continuous purification and supplement, and maintaining the quality of the indoor air and sufficient oxygen. Currently, air filtering membranes applied to the "Panelwell" skylight system mainly include products from US ENTEC and PPG companies.

Air filtering articles, for example, masks, air filters and respirators, gradually play an important role in maintaining green life and body health of human beings. The air filtering membranes must have functions such as retaining solid hazardous substances in air or having an adsorption reaction therewith, then objects of purifying air and guaranteeing human health can be achieved. At present, most of the air filtering membranes for daily use and medical use available in the market, for example, masks, air filters, and respirators, are prepared by an electrostatic spinning method. For example, CN103480285A discloses a reinforced polysulfone nano-fiber air filtering membrane and an electrostatic spinning preparing method thereof, and CN104368245A also discloses an electrostatic spinning air filtering membrane and a preparing method thereof. However, the air filtering membranes prepared by the electrostatic spinning are low in mechanical strength, and prone to damage during use, with relatively poor deformation resistance and heat resistance after long-term use, meanwhile, efficiency of preparing the air filtering membranes using the electrostatic spinning process is relatively low.

SUMMARY

One of the objects of the present disclosure is to provide a uniformly structured high-permeability microporous membrane for filtering, in particular gas filtering and a method for preparing the same, a flat filtering element and a gas filtering article. This microporous membrane is high in mechanical strength, and uniform in micropore distribution, and its filtering efficiency for PM 2.5 is up to no less than 90%.

In order to realize at least one of the above objects, the present disclosure uses a following technical solution:

A uniformly structured high-permeability microporous membrane for filtering is composed of following raw materials in parts by weight:

100-110 parts of polyethylene, 27-30 parts of acrylonitrile, 0.1-0.2 parts of dicumyl peroxide, 2-4 parts of plasticizer, 1-2 parts of antimonous oxide, 0.8-1 parts of zinc borate, 1-2 parts of antioxidant, 0.8-2 parts of heat stabilizer, 1-2 parts of octylisothiazolinone, 1-3 parts of calcium propionate, 0.7-2 parts of triglycidyl isocyanurate, 4-6 parts of diacetone alcohol, 0.7-1 parts of oleic diethanolamide, 0.5-1 parts of sodium myrastate and 1-2 parts of glycolic acid.

The antioxidant is one or more selected from the group consisting of a phenol, an amine, a phosphorus-containing compound, a sulfur-containing compound and an organic metal salt.

The heat stabilizer is one or more selected from the group consisting of tribasic lead carbonate, dibasic lead phosphite, cadmium salt, barium salt, calcium salt, zinc salt, and magnesium salt of stearic acid and lauric acid, and dithiol isooctyl acetate.

A method for preparing a uniformly structured high-permeability microporous membrane for filtering includes following steps:

(1) adding octylisothiazolinone to deionized water 17-20 times the weight of octylisothiazolinone, stirring them evenly, adding calcium propionate, heating them to a temperature of 40-50° C., keeping the temperature and stirring them for 4-9 minutes, adding diacetone alcohol, and continuing to keep the temperature and stirring them for 10-20 minutes, to obtain a bacteriostatic emulsion;

(2) adding sodium myrastate to absolute ethyl alcohol 6-9 times the weight of sodium myrastate, stirring them evenly, adding glycolic acid, keeping a temperature at 70-90° C. and stirring them for 20-30 minutes, adding triglycidyl isocyanurate, and stirring them to room temperature, to obtain a saponified ester solution:

(3) mixing antimonous oxide and zinc borate, adding the mixture to deionized water 26-30 times the weight of the mixture, stirring them evenly, adding oleic diethanolamide, keeping a temperature at 40-50° C. and stirring them for 10-20 minutes, to obtain a flame retardant amide dispersion;

(4) adding acrylonitrile to the above bacteriostatic emulsion, stirring them evenly, feeding them into a reaction kettle, adjusting the temperature in the reaction kettle to 76-80° C., introducing nitrogen, adding dicumyl peroxide, keeping the temperature and stirring them for 1-2 hours, discharging them to be mixed with the above saponified ester solution, stirring them evenly, distilling them to remove ethyl alcohol, feeding them into an oven to be dried at 86-90° C. for 40-50 minutes, and discharging them to be cooled, to obtain polyacrylonitrile with a high viscosity;

(5) adding a heat stabilizer to the above flame retardant amide dispersion, stirring them evenly, adding the above polyacrylonitrile with a high viscosity, keeping a temperature at 60-70° C. and stirring them for 30-40 minutes, to obtain a flame retardant polyacrylonitrile amide dispersion;

(6) mixing the above flame retardant polyacrylonitrile amide dispersion with polyethylene, plasticizer, and antioxidant, stirring them evenly, followed by dehydration, feeding them into an extruder, and melting and plasticizing them uniformly into a melt in a condition at a temperature of 200-240° C.;

(7) extruding the resulted melt into a cast piece from a die head, subsequently entering a tape casting process, to obtain an intermediate membrane I with a thickness of 8-40 μm, wherein the die head has a temperature of 185-240° C., and a tape casting temperature is 50-110° C.;

(8) performing an annealing treatment for the intermediate membrane I under micro tension to obtain an intermediate membrane II, wherein an annealing temperature is 90-160° C., the membrane in an annealing device has a speed of 1-20 m/min, a longitudinal tension of 0.1-3.0 N, a longitudinal stretch ratio of 1.0-2.0, and an annealing period of 5-60 min;

(9) performing longitudinal extension perforation for the intermediate membrane II to obtain an intermediate membrane HI, wherein a temperature is 100-150° C., and a speed ratio is 0.5-3.0;

(10) performing retraction and molding for the intermediate membrane III to obtain an intermediate membrane IV, wherein a retraction ratio is 1.0-1.5, and a molding temperature is 100-160° C.;

(11) performing secondary longitudinal extension perforation for the intermediate membrane IV to obtain the uniformly structured high-permeability microporous membrane for filtering, wherein a temperature is 100-140° C., and a speed ratio is 0.5-2.0.

The present disclosure further provides a method for preparing a microporous membrane for filtering, including:

extruding a melt from a die head with a temperature of 185-240° C. to prepare a cast piece;

performing tape casting for the cast piece in a condition at a temperature of 50-110° C. to prepare an intermediate membrane I of 8-40 μm;

performing an annealing treatment for the intermediate membrane I to obtain an intermediate membrane II, wherein an annealing temperature is 90-160° C., the intermediate membrane I in an annealing device has a speed of 1-20 m/min, a longitudinal tension of 0.1-3.0 N, a longitudinal stretch ratio of 1.0-2.0, and an annealing period of 5-60 min;

performing longitudinal extension perforation for the intermediate membrane II to obtain an intermediate membrane HI, wherein an temperature of the extension perforation is 100-150° C., and a speed ratio of the extension perforation is 0.5-3.0;

performing retraction and molding for the intermediate membrane III to obtain an intermediate membrane IV, wherein a retraction ratio is 1.0-1.5, and a molding temperature is 100-160° C.;

performing secondary longitudinal extension perforation for the intermediate membrane IV, wherein a temperature of the secondary extension perforation is 100-140° C., and a speed ratio of the secondary extension perforation is 0.5-2.0.

The present disclosure further provides a flat filtering element, including the microporous membrane prepared by any one of the above preparing methods.

The present disclosure further provides a gas filtering article, including the above flat filtering element.

The present disclosure has following advantages:

In the present disclosure, the polyolefin microporous membrane for gas filtering is prepared using the melt-extrusion-stretching method, and in the production process, the thickness, pore size distribution and porepermeability of the microporous membrane can be precisely controlled by adjusting the viscosity of the melt, the stretch ratio, the annealing temperature in thermal treatment, and so on;

The microporous membrane for gas filtering prepared thereby has a particularly remarkable filtering effect for PM 2.5, and its filtering efficiency for PM 2.5 is up to no less than 90%, and especially in a preferred solution of the present disclosure, the filtering efficiency is up to 95%, far higher than the filtering efficiency of about 80% in the prior art;

The microporous membrane for gas filtering prepared in the present disclosure is far better than nanofiber membranes prepared with a method such as melt spinning and electrostatic spinning in terms of mechanical strength, for example, tensile strength, and puncture resistance;

Compared with other existing processes, the process of the present disclosure is simple, high in yield, and suitable for large-scale continuous production, and the high production efficiency reduces the production cost; moreover, polyolefin is used in the present disclosure, thereby a cost of raw materials is low, and a cost of the final gas filtering membrane will be significantly reduced;

In the course of using the process of the present disclosure, small-molecule liquid solvents, especially ingredients causing environmental pollution, are not used or produced, therefore the process is environmentally friendly;

In the present disclosure, octylisothiazolinone and calcium propionate are mixed to act as a bacteriostatic additive, to obtain the bacteriostatic emulsion, then polymerization is performed under an initiation effect of dicumyl peroxide with acrylonitrile as monomers, and the bacteriostatic emulsion as a reaction solvent, and the polymers obtained have very good bacteriostatic performances, and can effectively improve the bacteriostatic property of a finished microporous membrane;

In the present disclosure, sodium myrastate is dispersed in an esterification solution, then bacteriostatic polyacrylonitrile undergoes a modification treatment, therefore, the viscosity of the polymer can be effectively improved, and the stability and strength of the finished microporous membrane can be enhanced.

BRIEF DESCRIPTION OF DRAWING

FIG. 1 shows an electron microscopic picture of a microporous membrane prepared in Example 1 of the present disclosure.

DETAILED DESCRIPTION OF EMBODIMENTS

In the text below, the present disclosure will be described more comprehensively in combination with examples. The present disclosure can have various examples, and modifications and alterations can be made thereto. However, it should be understood that it is not intended to limit the various examples of the present disclosure to the specific examples disclosed herein, while the present disclosure should be construed as covering all modifications, equivalents and/or optional solutions falling within the spirit and scope of various examples of the present disclosure.

In the text below, the term "include" or "can include" that can be used in various examples of the present disclosure indicates presence of the disclosed function, operation or element, and does not limit the increasing of one or more functions, operations or elements.

In the various examples of the present disclosure, the wording "or" or "at least one of A or/and B" includes any combination or all combinations of the words listed at the same time. For example, the wording "A or B" or "at least one of A or/and B" can include A, can include B or can include both A and B.

The terms used in the various examples of the present disclosure are merely for the purpose of describing specific examples, rather than limiting the various examples of the present disclosure. As used herein, a singular form is also intended to include plural form, unless clearly indicates otherwise in the context. Unless otherwise defined, all terms (including technical terms and scientific terms) used herein have the same meaning as that generally understood by a person ordinarily skilled in the art of the various examples of the present disclosure. The terms (such as terms defined in dictionaries commonly used) shall be construed as having the same meaning as that in the context of relevant technical field and shall not be construed as having an ideal meaning or overformal meaning, unless clearly defined in the various examples of the present disclosure.

The present example provides a uniformly structured high-permeability microporous membrane for filtering, which is composed of following raw materials in parts by weight:

100-110 parts of polyethylene, 27-30 parts of acrylonitrile, 0.1-0.2 parts of dicumyl peroxide, 2-4 parts of plasticizer, 1-2 parts of antimonous oxide, 0.8-1 parts of zinc borate, 1-2 parts of antioxidant, 0.8-2 parts of heat stabilizer, 1-2 parts of octylisothiazolinone, 1-3 parts of calcium propionate, 0.7-2 parts of triglycidyl isocyanurate, 4-6 parts of diacetone alcohol, 0.7-1 parts of oleic diethanolamide, 0.5-1 parts of sodium myrastate and 1-2 parts of glycolic acid.

The antioxidant is one or more selected from the group consisting of a phenol, an amine, a phosphorus-containing compound, a sulfur-containing compound and an organic metal salt.

The heat stabilizer is one or more selected from the group consisting of tribasic lead carbonate, dibasic lead phosphite, cadmium salt, barium salt, calcium salt, zinc salt, and magnesium salt of stearic acid and lauric acid, and dithiol isooctyl acetate.

The plasticizer can be phthalate, and also can be other existing plasticizers.

A method for preparing a uniformly structured high-permeability microporous membrane for filtering includes following steps:

(1) adding octylisothiazolinone to deionized water 17-20 times the weight of octylisothiazolinone, stirring them evenly, adding calcium propionate, heating them to a temperature of 40-50° C., keeping the temperature and stirring them for 4-9 minutes, adding diacetone alcohol, and continuing to keep the temperature and stirring them for 10-20 minutes, to obtain a bacteriostatic emulsion;

(2) adding sodium myrastate to absolute ethyl alcohol 6-9 times the weight of sodium myrastate, stirring them evenly, adding glycolic acid, keeping a temperature at 70-90° C. and stirring them for 20-30 minutes, adding triglycidyl isocyanurate, and stirring them to room temperature, to obtain a saponified ester solution;

(3) mixing antirnonous oxide and zinc borate, adding them to deionized water 26-30 times the weight of the mixture, stirring them evenly, adding oleic diethanolamide, keeping a temperature at 40-50° C. and stirring them for 10-20 minutes, to obtain a flame retardant amide dispersion;

(4) adding acrylonitrile to the above bacteriostatic emulsion, stirring them evenly, feeding them into a reaction kettle, adjusting a temperature in the reaction kettle to 76-80° C., introducing nitrogen, adding dicumyl peroxide, keeping the temperature and stirring them for 1-2 hours, discharging them to be mixed with the above saponified ester solution, stirring them evenly, distilling them to remove ethyl alcohol, feeding them into an oven to be dried at 86-90° C. for 40-50 minutes, and discharging them to be cooled, to obtain polyacrylonitrile with a high viscosity;

(5) adding a heat stabilizer to the above flame retardant amide dispersion, stirring them evenly, adding the above polyacrylonitrile with a high viscosity, keeping a temperature at 60-70° C. and stirring them for 30-40 minutes, to obtain a flame retardant polyacrylonitrile amide dispersion;

(6) mixing the above flame retardant polyacrylonitrile amide dispersion with polyethylene, plasticizer, and antioxidant, stirring them evenly, followed by dehydration, feeding them into an extruder, and melting and plasticizing them uniformly into a melt in a condition at a temperature of 200-240° C.;

(7) extruding the resulted melt into a cast piece from a die head, subsequently entering a tape casting process, to obtain an intermediate membrane I with a thickness of 8-40 μm, wherein the die head has a temperature of 185-240° C., and a tape casting temperature is 50-110° C.;

(8) performing an annealing treatment for the intermediate membrane I under micro tension to obtain an intermediate membrane II, wherein an annealing temperature is 90-160° C., the membrane in an annealing device has a speed of 1-20 m/min, a longitudinal tension of 0.1-3.0 N, a longitudinal stretch ratio of 1.0-2.0, and an annealing period of 5-60 min;

(9) performing longitudinal extension perforation for the intermediate membrane II to obtain an intermediate membrane III, wherein a temperature is 100-150° C., and a speed ratio is 0.5-3.0:

(10) performing retraction and molding for the intermediate membrane HI to obtain an intermediate membrane IV, wherein a retraction ratio is 1.0-1.5 and a molding temperature is 100-160° C.;

(11) performing secondary longitudinal extension perforation for the intermediate membrane IV to obtain the uniformly structured high-permeability microporous membrane for filtering, wherein a temperature is 100-140° C., and a speed ratio is 0.5-2.0.

The filtering membrane prepared with the above method has relatively high mechanical strength, for example, tensile strength, and puncture resistance, and has very good bacteriostatic performances and relatively high filtering efficiency for PM 2.5.

A method for preparing a microporous membrane for filtering provided in the present example includes:

extruding a melt from a die head with a temperature of 185-240° C. to prepare a cast piece;

performing tape casting for the cast piece in a condition at a temperature of 50-110° C. to prepare an intermediate membrane I of 8-40 μm;

performing an annealing treatment for the intermediate membrane I to obtain an intermediate membrane II, wherein an annealing temperature is 90-160° C., the intermediate membrane I in an annealing device has a speed of 1-20 m/min, a longitudinal tension of 0.1-3.0 N, a longitudinal stretch ratio of 1.0-2.0, and an annealing period of 5-60 min;

performing longitudinal extension perforation for the intermediate membrane II to obtain an intermediate membrane III, wherein a temperature of the extension perforation is 100-150° C., and a speed ratio of the extension perforation is 0.5-3.0;

performing retraction and molding for the intermediate membrane III to obtain an intermediate membrane IV, wherein a retraction ratio is 1.0-1.5, and a molding temperature is 100-160° C.;

performing secondary longitudinal extension perforation for the intermediate membrane IV, wherein a temperature of the secondary extension perforation is 100-140° C., and a speed ratio of the secondary extension perforation is 0.5-2.0.

In this preparing method, the thickness, pore size distribution and pore permeability of the microporous membrane are precisely controlled by adjusting the viscosity of the melt, the stretch ratio, the annealing temperature in the thermal treatment, and so on.

In the above, "longitudinal" includes along a movement direction of the intermediate membrane I or the intermediate membrane II, Strictly speaking, according to the law of action and reaction, it further includes along a direction opposite to the movement direction of the intermediate membrane I or the intermediate membrane II. For example, when a longitudinal tension is applied to the intermediate membrane I, a front roller set rotates quickly to apply a force to the intermediate membrane I in the movement direction, meanwhile, a rear roller set rotates at a relatively low speed and will prevent the intermediate membrane I from moving forward, equivalent to applying to the intermediate membrane I a force opposite to the movement direction.

The speed ratio of the extension perforation and the speed ratio of the secondary extension perforation are both total speed ratios. As common knowledge in the art, the total speed ratio is not 1. The total speed ratio can be simply understood as a ratio of a linear speed of a first roller set to a linear speed of a last roller set acting on the intermediate membrane 1 or the intermediate membrane II along the movement direction.

Furthermore, in an optional example of the present disclosure, the annealing temperature is 100-150° C., the intermediate membrane I in the annealing device has a speed of 5-15 m/min, the longitudinal tension of 0.5-3.0 N, the stretch ratio of 1.0-2.0, and the annealing period of 10-50 min; the temperature of the extension perforation is 120-150° C., the speed ratio of the extension perforation is 0.8-3.0; the retraction ratio is 1.0-1.5, the molding temperature is 120-160° C.; the temperature of the secondary extension perforation is 100-140° C., and the speed ratio of the secondary extension perforation is 0.5-2.0.

Furthermore, in an optional example of the present disclosure, the annealing temperature is 110-160° C., the intermediate membrane I in the annealing device has the speed of 10-20 m/min, the tension along the movement direction of the intermediate membrane I is 1-3.0 N, the stretch ratio is 1.2-2.0, the annealing period is 20-60 min; the temperature of the extension perforation is 130-150° C., the speed ratio of the extension perforation is 1.5-3.0; the retraction ratio is 1.0-1.5, the molding temperature is 130-160° C.; the temperature of the secondary extension perforation is 100-120° C., and the speed ratio of the secondary extension perforation is 0.5-2.0.

Furthermore, in an optional example of the present disclosure, the temperature of the secondary extension perforation is lower than that of the extension perforation.

Various parameters of the extension perforation and of the secondary extension perforation are matched with each other, such that a finished membrane has a uniform pore shape, a suitable size, balanced permeability and filtering property, and high tensile strength.

Furthermore, in an optional example of the present disclosure, the melt mainly includes thermoplastic polymers with a melting point of 200-240° C.; preferably, in parts by weight, raw materials for preparing the melt include 100-110 parts of polyethylene and 27-30 parts of acrylonitrile; the raw materials for preparing the melt further include 0.1-0.2 parts of dicumyl peroxide, 2-4 parts of plasticizer, 1-2 parts of antimonous oxide, 0.8-1 parts of zinc borate, 1-2 parts of antioxidant, 0.8-2 parts of heat stabilizer, 1-2 parts of octylisothiazolinone, 1-3 parts of calcium propionate, 0.7-2 parts of triglycidyl isocyanurate, 4-6 parts of diacetone alcohol, 0.7-1 parts of oleic diethanolamide, 0.5-1 parts of sodium myrastate and 1-2 parts of glycolic acid.

Furthermore, in an optional example of the present disclosure, the melt is prepared through following steps:

mixing octylisothiazolinone, calcium propionate, diacetone alcohol and deionized water to prepare a bacteriostatic emulsion;

mixing sodium rnyrastate, absolute ethyl alcohol, glycolic add and triglycidyl isocyanurate to prepare a saponified ester solution;

mixing antimonous oxide, zinc borate, deionized water and oleic diethanolamide to prepare a flame retardant amide dispersion;

mixing acrylonitrile with the bacteriostatic emulsion, adding dicumyl peroxide, under a nitrogen atmosphere in a condition at a temperature of 76-80° C., keeping the temperature and mixing them for 1-2 hours, discharging them, then mixing them with the saponified ester solution, distilling them to remove ethyl alcohol, drying them at 86-90° C. for 40-50 minutes, and discharging them to be cooled, to obtain polyacrylonitrile with a high viscosity;

mixing a heat stabilizer firstly with the above flame retardant amide dispersion, then mixing them with the polyacrylonitrile with a high viscosity at 60-70° C. for 30-40 minutes, to obtain a flame retardant polyacrylonitrile amide dispersion;

mixing the flame retardant polyacrylonitrile amide dispersion with polyethylene, plasticizer and antioxidant evenly, followed by dehydration, feeding them into an extruder, and melting and plasticizing them uniformly into a melt in a condition at a temperature of 200-240° C.

Furthermore, in an optional example of the present disclosure, the bacteriostatic emulsion is prepared through following steps:

adding octylisothiazolinone to deionized water 17-20 times the weight of octylisothiazolinone, then mixing them with calcium propionate, heating them to a temperature of 40-50° C., keeping the temperature and mixing them for 4-9 minutes, then mixing them with diacetone alcohol, continuing to keep the temperature and mixing them for 10-20 minutes, to obtain the bacteriostatic emulsion.

Mixing manners involved in the present disclosure optionally include mechanical stirring, magnetic stirring, etc.

Furthermore, in an optional example of the present disclosure, the saponified ester solution is prepared through following steps: adding sodium myrastate to absolute ethyl alcohol 6-9 times the weight of sodium myrastate, mixing them evenly, then mixing them with glycolic acid, keeping a temperature at 70-90° C. and mixing them for 20-30 minutes, then mixing them with triglycidyl isocyanurate, and cooling them to room temperature, to obtain a saponified ester solution.

Furthermore, in an optional example of the present disclosure, antimonous oxide and zinc borate are mixed to form a mixture, then the mixture is added to deionized water 26-30 times the weight of the mixture, they are mixed evenly, and mixed with oleic diethanolamide for 10-20 minutes, with a temperature being kept at 40-50° C., to obtain a flame retardant amide dispersion.

The present example further provides a flat filtering element, including the microporous membrane prepared by any one of the above preparing methods. A main element of the flat filtering element is the microporous membrane prepared with the above preparing methods, and the flat filtering element can further include other parts, for example, other existing strengthening layer, preliminary filtering layer or sterilizing layer. Since the microporous membranes obtained in certain examples of the present disclosure integrate high strength, thorough filtering and sterilization function, the microporous membranes can replace many existing membranes. Therefore, in certain examples, the microporous membranes can be directly used as the flat filtering element.

Furthermore, in an optional example of the present disclosure, a PET non-woven layer or a glass fiber needle mat layer attached to a surface of the microporous membrane is further included. The PET non-woven layer or the glass fiber needle mat layer can be connected to the microporous membrane in an existing connecting manner such as bonding and seaming.

Studies of the present disclosure reveal that for the polyolefin microporous membrane for gas filtering prepared by using the melt-extrusion-stretching method, the PET non-woven layer or the glass fiber needle mat layer is attached to two sides of the microporous membrane, rendering a more significant filtering effect for PM 2.5, meanwhile, the microporous membrane is not prone to damage in use, and has relatively strong deformation resistant capability and heat resistance in long-term use.

A gas filtering article includes the microporous membrane prepared by any one of the above preparing methods. Furthermore, in an optional example of the present disclosure, the gas filtering article is any one selected from the group consisting of a mask, a gas filter and a respirator.

Furthermore, in an optional example of the present disclosure, a PET non-woven layer or a glass fiber needle mat layer attached to a surface of the microporous membrane is further included.

The microporous membrane, the flat filtering element and the gas filtering article in the present disclosure not only can be used for gas filtering in daily life, but also can be used for gas filtering in industrial production processes.

Example 1

A uniformly structured high-permeability microporous membrane for filtering is composed of following raw materials in parts by weight:

110 parts of polyethylene, 30 parts of acrylonitrile, 0.2 parts of dicumyl peroxide, 4 parts of phthalate, 2 parts of antimonous oxide, 1 part of zinc borate, 2 parts of triethanolamine, 2 parts of dibasic lead phosphite, 2 parts of octylisothiazolinone, 3 parts of calcium propionate, 2 parts of triglycidyl isocyanurate, $ parts of diacetone alcohol, 1 part of oleic diethanolamide, part of sodium myrastate and 2 parts of glycolic acid.

A method for preparing a uniformly structured high-permeability microporous membrane for filtering includes following steps:

(1) adding octylisothiazolinone to deionized water 20 times the weight of octylisothiazolinone, stirring them evenly, adding calcium propionate, heating them to a temperature of 50° C., keeping the temperature and stirring them for 9 minutes, adding diacetone alcohol, and continuing to keep the temperature and stirring them for 20 minutes, to obtain a bacteriostatic emulsion;

(2) adding sodium myrastate to absolute ethyl alcohol 9 times the weight of sodium myrastate, stirring them evenly, adding glycolic acid, keeping a temperature at 90° C. and stirring them for 30 minutes, adding triglycidyl isocyanurate, and stirring them to room temperature, to obtain a saponified ester solution;

(3) mixing antimonous oxide and zinc borate, adding them to deionized water 30 times the weight of the mixture, stirring them evenly, adding oleic diethanolamide, keeping a temperature at 50° C. and stirring them for 20 minutes, to obtain a flame retardant amide dispersion;

(4) adding acrylonitrile to the above bacteriostatic emulsion, stirring them evenly, feeding them into a reaction kettle, adjusting a temperature in the reaction kettle to 80° C., introducing nitrogen, adding dicumyl peroxide, keeping the temperature and stirring them for 2 hours, discharging them to be mixed with the above saponified ester solution, stirring them evenly, distilling them to remove ethyl alcohol, feeding them into an oven to be dried at 90° C. for 50 minutes, and discharging them to be cooled, to obtain polyacrylonitrile with a high viscosity;

(5) adding a heat stabilizer to the above flame retardant amide dispersion, stirring them evenly, adding the above polyacrylonitrile with a high viscosity, keeping a temperature at 70° C. and stirring them for 40 minutes, to obtain a flame retardant polyacrylonitrile amide dispersion;

(6) mixing the above flame retardant polyacrylonitrile amide dispersion with polyethylene, phthalate, and antioxidant, stirring them evenly, followed by dehydration, feeding them into an extruder, and melting and plasticizing them uniformly into a melt in a condition at a temperature of 240° C.;

(7) extruding the resulted melt into a cast piece from a die head, subsequently entering a tape casting process, to obtain an intermediate membrane 1 with a thickness of 8-40 μm, wherein the die head has a temperature of 240° C., and a tape casting temperature is 110° C.;

(8) performing an annealing treatment for the intermediate membrane 1 under micro tension to obtain an intermediate membrane II, wherein an annealing temperature is 160° C., the membrane in an annealing device has a speed of 20 m/min, a longitudinal tension of 3.0 N, a longitudinal stretch ratio of 2.0, and an annealing period of 60 min;

(9) performing longitudinal extension perforation for the intermediate membrane II to obtain an intermediate membrane HI, wherein a temperature is 150° C., and a speed ratio is 3.0;

(10) performing retraction and molding for the intermediate membrane III to obtain an intermediate membrane IV, wherein a retraction ratio is 1.5, and a molding temperature is 160° C.;

(11) performing secondary longitudinal extension perforation for the intermediate membrane IV to obtain the uniformly structured high-permeability microporous membrane for filtering, wherein a temperature is 140° C., and a speed ratio is 2.0.

Example 2

A uniformly structured high-permeability microporous membrane for filtering is composed of following raw materials in parts by weight:

100 parts of polyethylene, 27 parts of acrylonitrile, 0.1 parts of dicumyl peroxide, 2 parts of phthalate, 1 part of antimonous oxide, 0.8 parts of zinc borate, 1 part of stannous sulfide, 0.8 parts of dithiol isooctyl acetate, 1 part of octylisothiazolinone, 1 part of calcium propionate, 0.7 parts of triglycidyl isocyanurate, 4 parts of diacetone alcohol, 0.7 parts of oleic diethanolamide, 0.5 parts of sodium myrastate and 1 part of glycolic acid.

A method for preparing a uniformly structured high-permeability microporous membrane for filtering includes following steps:

(1) adding octylisothiazolinone to deionized water 17 times the weight of octylisothiazolinone, stirring them evenly, adding calcium propionate, heating them to a temperature of 40° C., keeping the temperature and stirring them for 4 minutes, adding diacetone alcohol, and continuing to keep the temperature and stirring them for 10 minutes, to obtain a bacteriostatic emulsion;

(2) adding sodium myrastate to absolute ethyl alcohol 6 times the weight of sodium myrastate, stirring them evenly, adding glycolic acid, keeping a temperature at 70° C. and stirring them for 20 minutes, adding triglycidyl isocyanurate, and stirring them to a room temperature, to obtain a saponified ester solution;

(3) mixing antimonous oxide and zinc borate, adding them to deionized water 26 times the weight of the mixture, stirring them evenly, adding oleic diethanolamide, keeping a temperature at 40° C. and stirring them for 10 minutes, to obtain a flame retardant amide dispersion;

(4) adding acrylonitrile to the above bacteriostatic emulsion, stirring them evenly, feeding them into a reaction kettle, adjusting a temperature in the reaction kettle to 76° C., introducing nitrogen, adding dicumyl peroxide, keeping the temperature and stirring them for 1 hour, discharging them to be mixed with the above saponified ester solution, stirring them evenly, distilling them to remove ethyl alcohol, feeding them into an oven to be dried at 86° C. for 40 minutes, and discharging them to be cooled, to obtain polyacrylonitrile with a high viscosity;

(5) adding a heat stabilizer to the above flame retardant amide dispersion, stirring them evenly, adding the above polyacrylonitrile with a high viscosity, keeping a temperature at 60° C. and stirring them for 30 minutes, to obtain a flame retardant polyacrylonitrile amide dispersion;

(6) mixing the above flame retardant polyacrylonitrile amide dispersion with polyethylene, phthalate, and antioxidant, stirring them evenly, followed by dehydration, feeding them into an extruder, and melting and plasticizing them uniformly into a melt in a condition at a temperature of 200° C.;

(7) extruding the resulted melt into a cast piece from a die head, subsequently entering a tape casting process, to obtain an intermediate membrane I with a thickness of 8-40 μm, wherein the die head has a temperature of 185° C., and a tape casting temperature is 50° C.;

(8) performing an annealing treatment for the intermediate membrane I under micro tension to obtain an intermediate membrane II, wherein an annealing temperature is 90° C., the membrane in an annealing device has a speed of 10 m/min, a longitudinal tension of 0.1N, a longitudinal stretch ratio of 1.0, and an annealing period of 5 min;

(9) performing longitudinal extension perforation for the intermediate membrane II to obtain an intermediate membrane III, wherein a temperature is 100° C., and a speed ratio is 0.5;

(10) performing retraction and molding for the intermediate membrane III to obtain an intermediate membrane IV, wherein a retraction ratio is 1.0, and a molding temperature is 100° C.;

(11) performing secondary longitudinal extension perforation for the intermediate membrane IV to obtain the uniformly structured high-permeability microporous membrane for filtering, wherein a temperature is 100° C., and a speed ratio is 0.5.

Example 3

A uniformly structured high-permeability microporous membrane for filtering is composed of following raw materials in parts by weight:

110 parts of polyethylene, 27 parts of acrylonitrile, 0.1 parts of dicumyl peroxide, 2 parts of phthalate, 1' part of antimonous oxide, 0.8 parts of zinc borate, 1 part of antioxidant, 0.9 parts of heat stabilizer, 1 part of octylisothiazolinone, 2 parts of calcium propionate, 0.9 parts of triglycidyl isocyanurate, 4 parts of diacetone alcohol, 0.8 parts of oleic diethanolamide, 0.7 parts of sodium myrastate and 1 part of glycolic acid.

The antioxidant is zinc ricinoleate.

The heat stabilizer is tribasic lead sulfate.

A method for preparing a uniformly structured high-permeability microporous membrane for filtering includes following steps:

(1) adding octylisothiazolinone to deionized water 17 times the weight of octylisothiazolinone, stirring them evenly, adding calcium propionate, heating them to a temperature of 48° C., keeping the temperature and stirring them for 7 minutes, adding diacetone alcohol, and continuing to keep the temperature and stirring them for 17 minutes, to obtain a bacteriostatic emulsion;

(2) adding sodium myrastate to absolute ethyl alcohol 7 times the weight of sodium myrastate, stirring them evenly, adding glycolic acid, keeping a temperature at 70° C. and stirring them for 26 minutes, adding triglycidyl isocyanurate, and stirring them to room temperature, to obtain a saponified ester solution;

(3) mixing antimonous oxide and zinc borate, adding them to deionized water 26 times the weight of the mixture, stirring them evenly, adding oleic diethanolamide, keeping a temperature at 48° C. and stirring them for 16 minutes, to obtain a flame retardant amide dispersion;

(4) adding acrylonitrile to the above bacteriostatic emulsion, stirring them evenly, feeding them into a reaction kettle, adjusting a temperature in the reaction kettle to 76° C., introducing nitrogen, adding dicumyl peroxide, keeping the temperature and stirring them for 1 hour, discharging them to be mixed with the above saponified ester solution, stirring them evenly, distilling them to remove ethyl alcohol, feeding them into an oven to be dried at 88° C. for 48 minutes, and discharging them to be cooled, to obtain polyacrylonitrile with a high viscosity;

(5) adding a heat stabilizer to the above flame retardant amide dispersion, stirring them evenly, adding the above polyacrylonitrile with a high viscosity, keeping a temperature at 70° C. and stirring them for 40 minutes, to obtain a flame retardant polyacrylonitrile amide dispersion;

(6) mixing the above flame retardant polyacrylonitrile amide dispersion with polyethylene, phthalate, and antioxidant, stirring them evenly, followed by dehydration, feeding them into an extruder, and melting and plasticizing them uniformly into a melt in a condition at a temperature of 240° C.;

(7) extruding the resulted melt into a cast piece from a die head, subsequently entering a tape casting process, to obtain an intermediate membrane I with a thickness of 8-40 μm, wherein the die head has a temperature of 240° C., and a tape casting temperature is 90° C.;

(8) performing an annealing treatment for the intermediate membrane I under micro tension to obtain an intermediate membrane III, wherein an annealing temperature is 100° C., the membrane in an annealing device has a speed of 10 m/min, a longitudinal tension of 0.6 N, a longitudinal stretch ratio of 1.0, and an annealing period of 30 min;

(9) performing longitudinal extension perforation for the intermediate membrane it to obtain an intermediate membrane III, wherein a temperature is 130° C., and a speed ratio is 1.5;

(10) performing retraction and molding for the intermediate membrane III to obtain an intermediate membrane IV, wherein a retraction ratio is 1.0, and a molding temperature is 130° C.;

(11) performing secondary longitudinal extension perforation for the intermediate membrane IV to obtain the uniformly structured high-permeability microporous membrane for filtering, wherein a temperature is 140° C., and a speed ratio is 0.5.

Example 4

A uniformly structured high-permeability microporous membrane for filtering is composed of following raw materials in parts by weight:

100 parts of polyethylene, 27 parts of acrylonitrile, 0.1 parts of dicumyl peroxide, 2 parts of phthalate, 1 part of antimonous oxide, 0.8 parts of zinc borate, 1 part of stannous sulfide, 0.8 parts of dithiol isooctyl acetate, 1 part of octylisothiazolinone, I part of calcium propionate, 0.7 parts of triglycidyl isocyanurate, 4 parts of diacetone alcohol, 0.7 parts of oleic diethanolamide, 0.5 parts of sodium myrastate and 1 part of glycolic acid.

A method for preparing a uniformly structured high-permeability microporous membrane for filtering includes following steps:

(1) adding octylisothiazolinone to deionized water 17 times the weight of octylisothiazolinone, stirring them evenly, adding calcium propionate, heating them to a temperature of 40° C., keeping the temperature and stirring them for 4 minutes, adding diacetone alcohol, and continuing to keep the temperature and stirring them for 10 minutes, to obtain a bacteriostatic emulsion;

(2) adding sodium myrastate to absolute ethyl alcohol 6 times the weight of sodium myrastate, stirring them evenly, adding glycolic acid, keeping a temperature at 70° C. and stirring them for 20 minutes, adding triglycidyl isocyanurate, and stirring them to room temperature, to obtain a saponified ester solution;

(3) mixing antimonous oxide and zinc borate, adding them to deionized water 26 times the weight of the mixture, stirring them evenly, adding oleic diethanolamide, keeping a temperature at 40° C. and stirring them for 10 minutes, to obtain a flame retardant amide dispersion;

(4) adding acrylonitrile to the above bacteriostatic emulsion, stirring them evenly, feeding them into a reaction kettle, adjusting a temperature in the reaction kettle to 76° C., introducing nitrogen, adding dicumyl peroxide, keeping the temperature and stirring them for 1 hour, discharging them to be mixed with the above saponified ester solution, stirring them evenly, distilling them to remove ethyl alcohol, feeding them into an oven to be dried at 86° C. for 40 minutes, and discharging them to be cooled, to obtain polyacrylonitrile with a high viscosity;

(5) adding a heat stabilizer to the above flame retardant amide dispersion, stirring them evenly, adding the above polyacrylonitrile with a high viscosity, keeping a temperature at 60° C. and stirring them for 30 minutes, to obtain a flame retardant polyacrylonitrile amide dispersion;

(6) mixing the above flame retardant polyacrylonitrile amide dispersion with polyethylene, phthalate, and antioxidant, stirring them evenly, followed by dehydration, feeding them into an extruder, and melting and plasticizing them uniformly into a melt in a condition at a temperature of 200° C.;

(7) extruding the resulted melt into a cast piece from a die head, subsequently entering into a tape casting process, to obtain an intermediate membrane I with a thickness of 20 μm, wherein the die head has a temperature of 185 CC, and a tape casting temperature is 50° C.;

(8) performing an annealing treatment for the intermediate membrane I under micro tension to obtain an intermediate membrane II, wherein an annealing temperature is 90 CC, the membrane in an annealing device has a speed of 15 m/min, a longitudinal tension of 0.8 N, a longitudinal stretch ratio of 1.1, and an annealing period of 10 min;

(9) performing longitudinal extension perforation for the intermediate membrane II to obtain an intermediate membrane III, wherein a temperature is 120° C., and a speed ratio is 0.8;

(10) performing retraction and molding for the intermediate membrane III to obtain an intermediate membrane IV, wherein a retraction ratio is 1.0, and a molding temperature is 130° C.;

(11) performing secondary longitudinal extension perforation for the intermediate membrane IV to obtain the uniformly structured high-permeability microporous membrane for filtering, wherein a temperature is 100° C., and a speed ratio is 0.5.

Example 5

A uniformly structured high-permeability microporous membrane for filtering is composed of following raw materials in parts by weight:

100 parts of polyethylene, 27 parts of acrylonitrile, 0.1 parts of dicumyl peroxide, 2 parts of phthalate, 1 part of antimonous oxide, 0.8 part of zinc borate, 1 part of stannous sulfide, 0.8 parts of dithiol isooctyl acetate, 1 part of octylisothiazolinone, 1 part of calcium propionate, 0.7 parts of triglycidyl isocyanurate, 4 parts of diacetone alcohol, 0.7 part of oleic diethanolamide, 0.5 parts of sodium myrastate and 1 part of glycolic acid.

A method for preparing a uniformly structured high-permeability microporous membrane for filtering includes following steps:

(1) adding octylisothiazolinone to deionized water 17 times the weight of octylisothiazolinone, stirring them evenly, adding calcium propionate, heating them to a temperature of 40° C., keeping the temperature and stirring them for 4 minutes, adding diacetone alcohol, and continuing to keep the temperature and stirring them for 10 minutes, to obtain a bacteriostatic emulsion;

(2) adding sodium myrastate to absolute ethyl alcohol 6 times the weight of sodium myrastate, stirring them evenly, adding glycolic acid, keeping a temperature at 70° C. and stirring them for 20 minutes, adding triglycidyl isocyanurate, and stirring them to room temperature, to obtain a saponified ester solution;

(3) mixing antimonous oxide and zinc borate, adding them to deionized water 26 times the weight of the mixture, stirring them evenly, adding oleic diethanolamide, keeping a temperature at 40° C. and stirring them for 10 minutes, to obtain a flame retardant amide dispersion;

(4) adding acrylonitrile to the above bacteriostatic emulsion, stirring them evenly, feeding them into a reaction kettle, adjusting a temperature in the reaction kettle to 76° C., introducing nitrogen, adding dicumyl peroxide, keeping the temperature and stirring them for 1 hour, discharging them to be mixed with the above saponified ester solution, stirring them evenly, distilling them to remove ethyl alcohol, feeding them into an oven to be dried at 86° C. for 40 minutes, and discharging them to be cooled, to obtain polyacrylonitrile with a high viscosity;

(5) adding a heat stabilizer to the above flame retardant amide dispersion, stirring them evenly, adding the above polyacrylonitrile with a high viscosity, keeping a temperature at 60° C. and stirring them for 30 minutes, to obtain a flame retardant polyacrylonitrile amide dispersion;

(6) mixing the above flame retardant polyacrylonitrile amide dispersion with polyethylene, phthalate, and antioxidant, stirring them evenly, followed by dehydration, feeding them into an extruder, and melting and plasticizing them uniformly into a melt in a condition at a temperature of 200° C.;

(7) extruding the resulted melt into a cast piece from a die head, subsequently entering a tape casting process, to obtain an intermediate membrane I with a thickness of 40 μm, wherein the die head has a temperature of 185° C., and a tape casting temperature is 50° C.;

(8) performing an annealing treatment for the intermediate membrane I under micro tension to obtain an intermediate membrane II, wherein an annealing temperature is 90° C., the membrane in an annealing device has a speed of 10 m/min, a longitudinal tension of 1.1 N, a longitudinal stretch ratio of 2.0, and an annealing period of 20 min;

(9) performing longitudinal extension perforation for the intermediate membrane II to obtain an intermediate membrane III, wherein a temperature is 1130° C., and a speed ratio is 1.5;

(10) performing retraction and molding for the intermediate membrane III to obtain an intermediate membrane IV, wherein a retraction ratio is 1.0, and a molding temperature is 140° C.;

(11) performing secondary longitudinal extension perforation for the intermediate membrane IV to obtain the uniformly structured high-permeability microporous membrane for filtering, wherein a temperature is 110° C., and a speed ratio is 0.6.

TEST EXAMPLES

1. Test for Gas Permeability

1. Instrument

Asahi Gas Permeability Meter 2. Test Method

Tests were carried out according to a JIS P 8117-1988 paper and board gas permeability determination method.

A standard method for testing permeability was used. Three samples were chosen to measure a mean time t for 100 ml gas to pass therethrough.

The degree of gas permeability is represented by a time (T) required for each 100 ml gas to pass through the microporous membrane: T=t.

II. Determination of Puncture Strength

1. Tester

An electronic puncture strength tester; a puncture needle with a diameter φ of 1.65 mm, a needle tip SR=0.5 mm, 2. Test Method Tests were carried out according to provisions of ASTM D4833-00.

Three samples were taken from a product. The samples cut has a size of no less than 5 cm*5 cm. The samples were fixed on a sample platform, and the measurements were carried out using the electronic puncture strength tester. A mean value of test values of the three samples was taken after the tests were completed.

III. Determination of Tensile Strength

1. Tester

An electronic universal tensile testing machine.

2. Test Method

Tests were carried out according to provisions of GB/T 1040[1].3-2006.

5 samples were taken from a product, with a width of 15 mm and a length of 150 mm (a sample test gauge length was 100 mm).

Tests were carried out by controlling the electronic universal (tensile) testing machine with a CMT series microcomputer. A mean value of test values of the 5 samples was taken after the tests were completed.

IV. Determination of Filtering Efficiency for PM 2.5

1. Tester

A tester for filtering efficiency (%) for PM 2.5; a PM 2.5 particle detector.

2. Test Method

The tester was placed at an inlet to measure a number of dust particles per unit volume for 20 seconds, then the number was automatically displayed, then the tester was taken to an outlet to measure for 20 seconds. After the measurement was completed, a purification efficiency was automatically calculated according to the numbers of dust particles per unit volume currently measured at the inlet and the outlet.

All the above test results are listed in Table 1:

TABLE 1

Test Results of Examples 1-5

| Item | Example 1 | Example 2 | Example 3 | Example 4 | Example 5 |
|---|---|---|---|---|---|
| Tensile Strength (MD, MPa) | 180 | 192 | 186 | 175 | 190 |
| Tensile Strength (TD, MPa) | 80 | 75 | 90 | 76 | 85 |
| Gas Permeability (sec/100 ml) | 75 | 55 | 64 | 62 | 53 |
| Puncture Strength (g) | 600 | 560 | 650 | 630 | 624 |

TABLE 1-continued

Test Results of Examples 1-5

| Item | Example 1 | Example 2 | Example 3 | Example 4 | Example 5 |
|---|---|---|---|---|---|
| Filtering Efficiency (%) for PM 2.5 | 96 | 97 | 96 | 96 | 98 |

It can be seen from Table 1 that the high-permeability microporous membrane for filtering prepared with the method of the present disclosure is high in mechanical strength, uniform in micropore distribution, and not prone to damage in use, and has excellent deformation resistant capability and relatively strong heat resistance. Its filtering efficiency for PM 2.5 is up to no less than 90%.

The above-mentioned are merely for preferred examples of the present disclosure and not used to limit the present disclosure. For one skilled in the art, various modifications and changes may be made to the present disclosure. Any modifications, equivalent substitutions, improvements and so on, within the spirit and principle of the present disclosure, should be covered by the scope of protection of the present disclosure.

Industrial Applicability

In the present disclosure, the polyolefin microporous membrane for gas filtering is prepared through the melt-extrusion-stretching method, and in the production process, the thickness, pore size distribution and pore permeability of the microporous membrane can be precisely controlled by adjusting the viscosity of the melt, the stretch ratio, the annealing temperature in the thermal treatment, and so on. The microporous membrane has a particularly remarkable filtering effect for PM 2.5, and its filtering efficiency for PM 2.5 is up to no less than 90%, and especially in a preferred solution of the present disclosure, the filtering efficiency is up to 95% or more, far higher than the filtering efficiency of about 80% in the prior art. Moreover, the microporous membrane has relatively high mechanical strength and very good bacteriostatic performances. Compared with other existing methods, the preparing method of the present disclosure is simple in process, high in yield, and suitable for large-scale continuous production.

The invention claimed is:

1. A uniformly structured high-permeability microporous membrane for filtering, composed of following raw materials in parts by weight:
100-110 parts of polyethylene, 27-30 parts of acrylonitrile, 0.1-0.2 parts of dicumyl peroxide, 2-4 parts of plasticizer, 1-2 parts of antimonous oxide, 0.8-1 part of zinc borate, 1-2 parts of antioxidant, 0.8-2 parts of heat stabilizer, 1-2 parts of octylisothiazolinone, 1-3 parts of calcium propionate, 0.7-2 parts of triglycidyl isocyanurate, 4-6 parts of diacetone alcohol, 0.7-1 part of oleic diethanolamide, 0.5-1 part of sodium myrastate and 1-2 parts of glycolic acid.

2. The uniformly structured high-permeability microporous membrane for filtering of claim 1, wherein the antioxidant is one or more selected from the group consisting of a phenol, an amine, a phosphorus-containing compound, a sulfur-containing compound and an organic metal salt.

3. The uniformly structured high-permeability microporous membrane for filtering of claim 1, wherein the heat stabilizer is one or more selected from the group consisting of tribasic lead carbonate; dibasic lead phosphite; cadmium salt, barium salt, calcium salt, zinc salt and magnesium salt of stearic acid and lauric acid; and dithiol isooctyl acetate.

4. A method for preparing a microporous membrane for filtering, comprising:
extruding a melt from a die head with a temperature of 185-240° C. to prepare a cast piece;
performing tape casting for the cast piece in a condition at a temperature of 50-110° C. to prepare an intermediate membrane I of 8-40 μm;
performing an annealing treatment for the intermediate membrane I to obtain an intermediate membrane II, wherein an annealing temperature is 90-160° C., the intermediate membrane I in an annealing device has a speed of 1-20 n/min, a longitudinal tension of 0.1-3.0 N, a longitudinal stretch ratio of 1.0-2.0, and an annealing period of 5-60 min;
performing longitudinal extension perforation for the intermediate membrane II to obtain an intermediate membrane III, wherein a temperature of the extension perforation is 100-150° C., and a speed ratio of the extension perforation is 0.5-3.0;
performing retraction and molding for the intermediate membrane III to obtain an intermediate membrane IV, wherein a retraction ratio is 1.0-1.5, and a molding temperature is 100-160° C.; and
performing secondary longitudinal extension perforation for the intermediate membrane IV, wherein a temperature of the secondary extension perforation is 100-140° C., and a speed ratio of the secondary extension perforation is 0.5-2.0.

5. The preparing method of claim 4, wherein the preparing method comprises following steps:
(1) adding octylisothiazolinone to deionized water 17-20 times the weight of octylisothiazolinone, stirring them evenly, adding calcium propionate, heating them to a temperature of 40-50° C., keeping the temperature and stirring them for 4-9 minutes, adding diacetone alcohol, and continuing to keep the temperature and stirring them for 10-20 minutes, to obtain a bacteriostatic emulsion;
(2) adding sodium myrastate to absolute ethyl alcohol 6-9 times the weight of sodium myrastate, stirring them evenly, adding glycolic acid, keeping a temperature at 70-90° C. and stirring them for 20-30 minutes, adding triglycidyl isocyanurate, and stirring them to room temperature, to obtain a saponified ester solution;
(3) mixing antimonous oxide and zinc borate, adding them to deionized water 26-30 times the weight of the mixture, stirring them evenly, adding oleic diethanolamide, keeping a temperature at 40-50° C. and stirring them for 10-20 minutes, to obtain a flame retardant amide dispersion;
(4) adding acrylonitrile to the above bacteriostatic emulsion, stirring them evenly, feeding them into a reaction kettle, adjusting a temperature in the reaction kettle to 76-80° C., introducing nitrogen, adding dicumyl peroxide, keeping the temperature and stirring them for 1-2 hours, discharging them to be mixed with the above saponified ester solution, stirring them evenly, distilling them to remove ethyl alcohol, feeding them into an oven to be dried at 86-90° C. for 40-50 minutes, and discharging them to be cooled, to obtain polyacrylonitrile with a high viscosity;
(5) adding a heat stabilizer to the above flame retardant amide dispersion, stirring them evenly, adding the above polyacrylonitrile with a high viscosity, keeping a temperature at 60-70° C. and stirring them for 30-40 minutes, to obtain a flame retardant polyacrylonitrile amide dispersion;

(6) mixing the above flame retardant polyacrylonitrile amide dispersion with polyethylene, plasticizer, and antioxidant, stirring them evenly, followed by dehydration, feeding them into an extruder, and melting and plasticizing them uniformly into a melt in a condition at a temperature of 200-240° C.;

(7) extruding the resulted melt into the cast piece from a die head, and subsequently entering a tape casting process, to obtain the intermediate membrane I with a thickness of 8-40 μm, wherein the die head has a temperature of 185-240° C., and a tape casting temperature is 50-110° C.;

(8) performing the annealing treatment for the intermediate membrane I under micro tension to obtain the intermediate membrane II, wherein the annealing temperature is 80-160° C., the membrane in the annealing device has the speed of 1-20 m/min, the longitudinal tension of 0.1-3.0 N, the longitudinal stretch ratio of 1.0-2.0, and the annealing period of 5-60 min;

(9) performing longitudinal extension perforation for the intermediate membrane II to obtain the intermediate membrane Ill, wherein the temperature is 100-150° C., and the speed ratio is 0.5-3.0;

(10) performing retraction and molding for the intermediate membrane Ill to obtain the intermediate membrane IV, wherein the retraction ratio is 1.0-1.5, and the molding temperature is 100-160° C.; and

(11) performing secondary longitudinal extension perforation for the intermediate membrane IV to obtain the uniformly structured high-permeability microporous membrane for filtering, wherein the temperature is 100-140° C., and the speed ratio is 0.5-2.9;

wherein the uniformly structured high-permeability microporous membrane for filtering prepared by the method is composed of following raw materials in parts by weight;

100-110 parts of polyethylene, 27-30 parts of acrylonitrile, 0.1-0.2 parts of dicumyl peroxide, 2-4 parts of plasticizer, 1-2 parts of antimonous oxide, 0.8-1 part of zinc borate, 1-2 parts of antioxidant, 0.8-2 parts of heat stabilizer, 1-2 parts of octylisothiazolinone, 1-3 parts of calcium propionate, 0.7-2 parts of triglycidyl isocyanurate, 4-6 parts of diacetone alcohol, 0.7-1 part of oleic diethanolamide, 0.5-1 part of sodium myrastate and 1-2 parts of glycolic acid.

6. The preparing method of claim 4, wherein the annealing temperature is 100-150° C., the intermediate membrane I in the annealing device has the speed of 5-15 m/min, the longitudinal tension of 0.5-3.0 N, the stretch ratio of 1.0-2.0, and the annealing period of 10-50 min; the temperature of the extension perforation is 120-150° C., the speed ratio of the extension perforation is 0.8-3.0; the retraction ratio is 1.0-1.5, the molding temperature is 120-160° C.; the temperature of the secondary extension perforation is 100-140° C., and the speed ratio of the secondary extension perforation is 0.5-2.0.

7. The preparing method of claim 4, wherein the annealing temperature is 110-160° C., the intermediate membrane I in the annealing device has the speed of 10-20 m/min, a tension along the movement direction of the intermediate membrane I is 1-3.0 N, the stretch ratio is 1.2-2.0, the annealing period is 20-60 min; the temperature of the extension perforation is 130-150° C., the speed ratio of the extension perforation is 1.5-3.0; the retraction ratio is 1.0-1.5, the molding temperature is 130-160° C.; the temperature of the secondary extension perforation is 100-120° C., and the speed ratio of the secondary extension perforation is 0.5-2.0.

8. The preparing method of claim 4, wherein the temperature of the secondary extension perforation is lower than that of the extension perforation.

9. The preparing method of claim 6, wherein the temperature of the secondary extension perforation is lower than that of the extension perforation.

10. The preparing method of claim 7, wherein the temperature of the secondary extension perforation is lower than that of the extension perforation.

11. The preparing method of claim 4, wherein the melt mainly comprises thermoplastic polymers with a melting point of 200-240° C.

12. The preparing method of claim 11, wherein raw materials for preparing the melt comprise in parts by weight 100-110 parts of polyethylene and 27-30 parts of acrylonitrile; the raw materials for preparing the melt further comprise 0.1-0.2 parts of dicumyl peroxide, 2-4 parts of plasticizer, 1-2 parts of antimonous oxide, 0.8-1 part of zinc borate, 1-2 parts of antioxidant, 0.8-2 parts of heat stabilizer, 1-2 parts of octylisothiazolinone, 1-3 parts of calcium propionate, 0.7-2 parts of triglycidyl isocyanurate, 4-6 parts of diacetone alcohol, 0.7-1 part of oleic diethanolamide, 0.5-1 part of sodium myrastate and 1-2 parts of glycolic acid.

13. The preparing method of claim 11, wherein the melt is prepared through following steps:

mixing octylisothiazolinone, calcium propionate, diacetone alcohol and deionized water to prepare a bacteriostatic emulsion;

mixing sodium myrastate, absolute ethyl alcohol, glycolic acid and triglycidyl isocyanurate to prepare a saponified ester solution;

mixing antimonous oxide, zinc borate, deionized water and oleic diethanolamide to prepare a flame retardant amide dispersion;

mixing acrylonitrile with the bacteriostatic emulsion, adding dicumyl peroxide under nitrogen atmosphere in a condition at a temperature of 76-80° C., keeping the temperature and mixing them for 1-2 hours, discharging them, then mixing them with the saponified ester solution, distilling them to remove ethyl alcohol, drying them at 86-90° C. for 40-50 minutes, and discharging them to be cooled, to obtain polyacrylonitrile with a high viscosity;

mixing a heat stabilizer firstly with the above flame retardant amide dispersion, then mixing them with the polyacrylonitrile with a high viscosity at 60-70° C. for 30-40 minutes, to obtain a flame retardant polyacrylonitrile amide dispersion; and mixing evenly the flame retardant polyacrylonitrile amide dispersion with polyethylene, plasticizer and antioxidant, followed by dehydration, feeding them into an extruder, and melting and plasticizing them uniformly into the melt in a condition at a temperature of 200-240° C.

14. The preparing method of claim 13, wherein the bacteriostatic emulsion is prepared through following steps:

adding octylisothiazolinone to deionized water 17-20 times the weight of octylisothiazolinone, then mixing them with calcium propionate, heating them to a temperature of 40-50° C., keeping the temperature and mixing them for 4-9 minutes, then mixing them with diacetone alcohol, continuing to keep the temperature and mixing them for 10-20 minutes, to obtain the bacteriostatic emulsion.

15. The preparing method of claim 13, wherein the saponified ester solution is prepared through following steps: adding sodium myrastate to absolute ethyl alcohol 6-9 times the weight of sodium myrastate, mixing them evenly, then mixing them with glycolic acid, keeping a temperature at 70-90° C. and mixing them for 20-30 minutes, then mixing them with triglycidyl isocyanurate, and cooling them to room temperature, to obtain the saponified ester solution.

16. The preparing method of claim 14, wherein the saponified ester solution is prepared through following steps: adding sodium myrastate to absolute ethyl alcohol 6-9 times the weight of sodium myrastate, mixing them evenly, then mixing them with glycolic acid, keeping a temperature at 70-90° C. and mixing them for 20-30 minutes, then mixing them with triglycidyl isocyanurate, and cooling them to room temperature, to obtain the saponified ester solution.

17. The preparing method of claim 13, wherein antimonous oxide and zinc borate are mixed to form a mixture, then the mixture is added to deionized water 26-30 times the weight of the mixture to be mixed evenly, and mixed with oleic diethanolamide for 10-20 minutes, with a temperature being kept at 40-50° C., to obtain the flame retardant amide dispersion.

18. The preparing method of claim 14, wherein antimonous oxide and zinc borate are mixed to form a mixture, then the mixture is added to deionized water 26-30 times the weight of the mixture to be mixed evenly, and mixed with oleic diethanolamide for 10-20 minutes, with a temperature being kept at 40-50° C., to obtain the flame retardant amide dispersion.

19. A flat filtering element, wherein the flat filtering element comprises a microporous membrane, which is prepared by a preparing method comprising:
  extruding a melt from a die head with a temperature of 185-240° C. to prepare a cast piece;
  performing tape casting for the cast piece in a condition at a temperature of 50-110° C. to prepare an intermediate membrane I of 8-40 μm;
  performing an annealing treatment for the intermediate membrane I to obtain an intermediate membrane II, wherein an annealing temperature is 90-160° C., the intermediate membrane I in an annealing device has a speed of 1-20 m/min, a longitudinal tension of 0.1-3.0 N, a longitudinal stretch ratio of 1.0-2.0, and an annealing period of 5-60 min;
  performing longitudinal extension perforation for the intermediate membrane I1 to obtain an intermediate membrane III, wherein a temperature of the extension perforation is 100-150° C., and a speed ratio of the extension perforation is 0.5-3.0;
  performing retraction and molding for the intermediate membrane III to obtain an intermediate membrane IV, wherein a retraction ratio is 1.0-1.5, and a molding temperature is 100-160° C.; and
  performing secondary longitudinal extension perforation for the intermediate membrane IV, wherein a temperature of the secondary extension perforation is 100-140° C., and a speed ratio of the secondary extension perforation is 0.5-2.0.

20. The flat filtering element of claim 19, further comprising a polyethylene terephthalate (PET) non-woven layer or a glass fiber needle mat layer attached to a surface of the microporous membrane.

* * * * *